(12) United States Patent
Nachum

(10) Patent No.: US 8,842,574 B2
(45) Date of Patent: Sep. 23, 2014

(54) ENERGY EFFICIENT NETWORKING

(75) Inventor: Gai Nachum, Rishon le zion (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 185 days.

(21) Appl. No.: 13/296,719

(22) Filed: Nov. 15, 2011

(65) Prior Publication Data

US 2012/0127894 A1    May 24, 2012

Related U.S. Application Data

(60) Provisional application No. 61/415,776, filed on Nov. 19, 2010.

(51) Int. Cl.
| | | |
|---|---|---|
| *H04L 12/28* | (2006.01) | |
| *H04L 12/46* | (2006.01) | |
| *H04L 12/753* | (2013.01) | |
| *H04L 12/24* | (2006.01) | |
| *H04L 12/10* | (2006.01) | |
| *H04L 12/12* | (2006.01) | |

(52) U.S. Cl.
CPC ................ *H04L 12/10* (2013.01); *Y02B 60/35* (2013.01); *H04L 12/4604* (2013.01); *H04L 45/48* (2013.01); *H04L 41/0833* (2013.01); *Y02B 60/34* (2013.01); *H04L 12/12* (2013.01)
USPC ......................................................... 370/254

(58) Field of Classification Search
None
See application file for complete search history.

(56) References Cited

U.S. PATENT DOCUMENTS

| | | | | |
|---|---|---|---|---|
| 2006/0198323 | A1* | 9/2006 | Finn ............................. | 370/256 |
| 2006/0285499 | A1* | 12/2006 | Tzeng ......................... | 370/249 |
| 2007/0280239 | A1* | 12/2007 | Lund ........................... | 370/392 |
| 2010/0115295 | A1* | 5/2010 | Diab ............................ | 713/300 |
| 2010/0217965 | A1* | 8/2010 | Wolff .............................. | 713/2 |
| 2010/0293404 | A1* | 11/2010 | Diab ............................ | 713/324 |
| 2010/0312909 | A1* | 12/2010 | Diab ............................ | 709/238 |
| 2011/0019668 | A1* | 1/2011 | Diab et al. ................... | 370/389 |
| 2011/0022699 | A1* | 1/2011 | Powell et al. ................ | 709/224 |
| 2011/0029796 | A1* | 2/2011 | Matthews et al. ............ | 713/323 |
| 2011/0080919 | A1* | 4/2011 | Ding et al. ................... | 370/419 |
| 2011/0142080 | A1* | 6/2011 | Diab ............................ | 370/503 |
| 2012/0017105 | A1* | 1/2012 | Thyni et al. ................. | 713/323 |
| 2012/0124398 | A1* | 5/2012 | Diab ............................ | 713/310 |
| 2012/0254851 | A1* | 10/2012 | Diab ............................ | 717/171 |
| 2012/0269070 | A1* | 10/2012 | Bobrek et al. ................ | 370/241 |
| 2013/0034009 | A1* | 2/2013 | Tazebay et al. .............. | 370/252 |
| 2013/0051304 | A1* | 2/2013 | Matthews et al. ............ | 370/312 |
| 2013/0243007 | A1* | 9/2013 | Ding et al. ................... | 370/412 |
| 2013/0297787 | A1* | 11/2013 | Shah et al. ................... | 709/224 |
| 2013/0336163 | A1* | 12/2013 | Diab ............................ | 370/254 |

* cited by examiner

*Primary Examiner* — Suk Jin Kang

(57) ABSTRACT

Methods and systems for configuring networks are disclosed. For example, in an example of an embodiment, a network device includes a plurality of first ports each connected to a Local Area Network (LAN) segment, a network link circuit configured to generate network link notices conforming to a network forming protocol for establishing network links between the network device and other switches in the network so as to enable the other switches to select a network link by which to send packets to the network device, the generated link notices being based in part on a power consumption capability of one or more first ports in the network device, and transmit circuitry configured to transmit the network link notices to the other switches through one or more of the first ports.

20 Claims, 5 Drawing Sheets

ENERGY EFFICIENT NETWORKING

INCORPORATION BY REFERENCE

This application claims the benefit of U.S. Provisional Application No. 61/415,776 entitled "EEE AND STP" filed on Nov. 19, 2010, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Spanning Tree Protocol (STP) (IEEE standard 802.1D) is a data link layer (layer 2) protocol that provides a mechanism by which bridges in an Ethernet Local Area Network (LAN) can select a network link by which to transmit packets to other bridges in the network in an optimal and loop free manner. Rapid Spanning Tree Protocol (RSTP) is an evolution of STP that provides for a faster spanning tree convergence after a topology change. Multiple Spanning Tree Protocol (MSTP) is an extension of RSTP developed to further enhance the usefulness of virtual LANs (VLANs) by configuring a separate spanning tree for each VLAN group and blocking all but one possible alternate path within each spanning tree.

Energy Efficient Ethernet (EEE) (IEEE standard 802.4az) is a layer 1 protocol used to save energy by shutting down portions of the PHYsical layer (PHY) of an Ethernet node until the node is ready to send or receive data.

SUMMARY

Various aspects and embodiments of the invention are described in further detail below.

In an example embodiment, a network device includes a plurality of first ports each connected to a Local Area Network (LAN) segment, a network link circuit configured to generate network link notices conforming to a network forming protocol for establishing network links between the network device and other switches in the network so as to enable the other switches to select a network link by which to send packets to the network device, the generated link notices being based in part on a power consumption capability of one or more first ports in the network device, and transmit circuitry configured to transmit the network link notices to the other switches through one or more of the first ports.

In another example embodiment, a method for configuring a network includes generating network link notices conforming to a network forming protocol for establishing network links between a network device and other switches in the network so as to enable the other switches to select a network link by which to send packets to the network device, the generated link notices being based in part on a power consumption capability of one or more first ports in the network device, and transmitting the network link notices to the other switches through one or more of the first ports.

In yet another example embodiment, a network device includes a plurality of first ports each connected to a Local Area Network (LAN) segment, a network link circuit configured to receive network link notices conforming to a network forming protocol for establishing network links between the network device and other switches in the network, the received link notices including information about a power consumption capability of remote ports in the other network switches, a network cost calculating circuit configured to calculate total costs associated with using the plurality of ports for sending packets to the other network switches, said costs being based at least in part on the power consumption capability of the remote ports, and a port enable/disable circuit configured to enable or disable the plurality of first ports based on the calculated total costs.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

For the purpose of this disclosure, the term "Spanning Tree Protocol" (STP) refers generally to network protocol IEEE standard 802.1 D, as well as to RSTP, MSTP and all other derivative, extended or similar protocols. Similarly, the term "Energy Efficient Ethernet" (EEE) refer to IEEE standard protocol 802.4az, as well as to any other similar or derivative standard used to save energy by shutting down portions of the PHYsical layer (PHY) of a network node until the node is ready to send or receive data.

The present disclosure provides techniques to lower power consumption of a given network by enabling layer 2 link selection protocols, for example STP to take advantage of EEE (a layer 1 protocol) characteristics of various switches and or ports disposed in the various switches. That is, given that the PHYs of EEE-complaint switches have lower power consumption when in a power down mode, as compared to equivalent PHYs of non-BEE-compliant switches, the overall power consumption of a LAN can be reduced by selecting network links that favor non-BEE compliant switches and/or non-EEE compliant ports. In this manner, traffic transmitted through EEE compliant switches and/or ports will be reduced thereby increasing the opportunities in which the EEE compliant switches and/or ports can be powered down.

Figure 1:
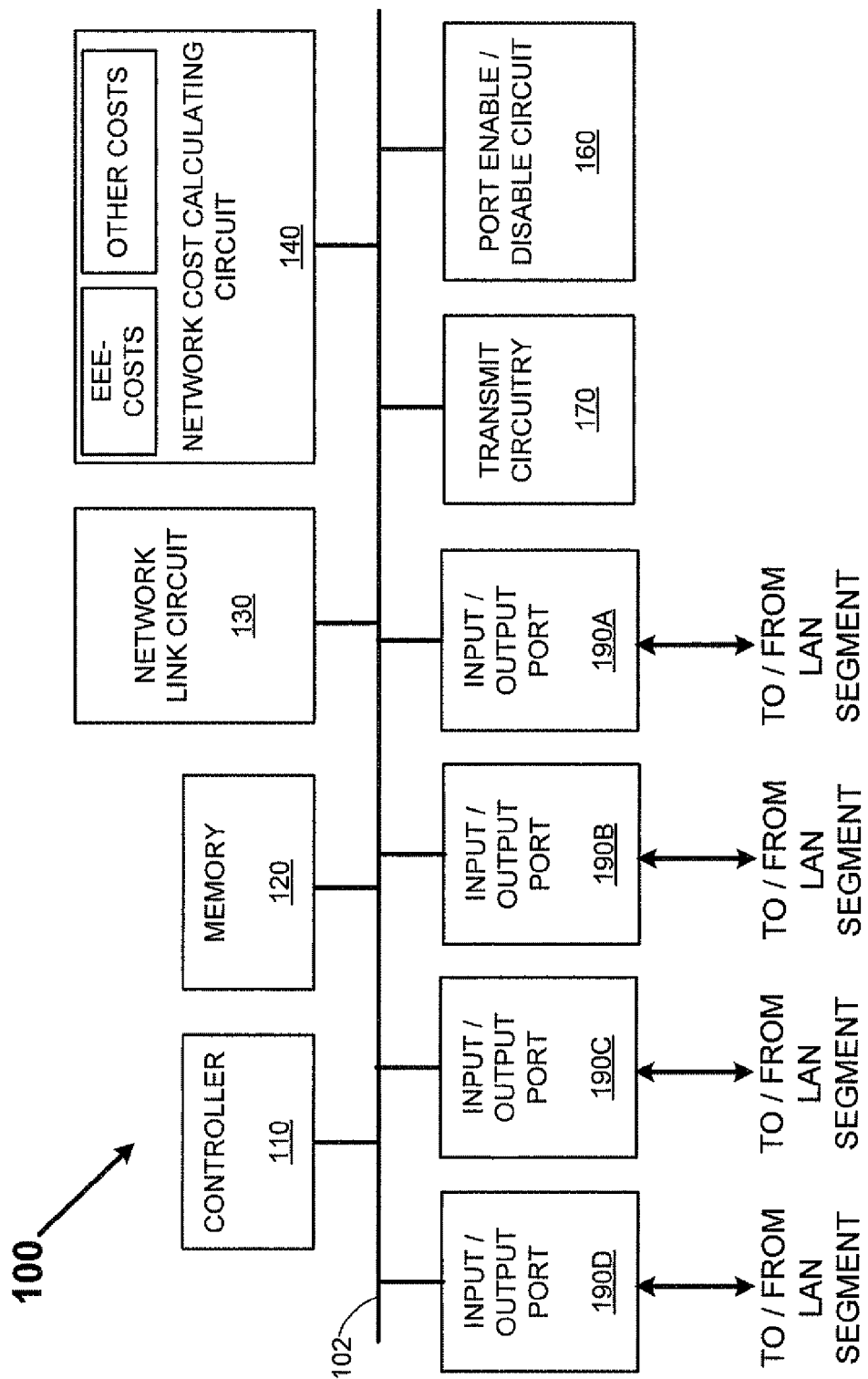
FIG. 1 depicts a functional example of a network switch capable of self-configuring based upon energy-saving criteria.

FIG. 1 depicts a functional example of a network switch 100 capable of self-configuring based upon energy-saving criteria. The network switch 100 includes a controller 110, a memory 120, a network link circuit 130, a network cost calculating circuit 140, a port enable/disable determining circuit 160, a transmit circuit 170, and four input/output ports [190A . . . 190D] leading to various Local Area Network (LAN) segments. Components 110-190D are connected by control/data bus 102.

While a bussed architecture is depicted in FIG. 1, it is noted that various other control topographies can be used, such as topographies where some or all of circuit modules 120-190D are realized without need of the controller 110. It is also noted that some or all of circuits 130-170 may be realized as computer-executable code residing in memory 120 and acted upon by the controller 110.

In operation and under control of the controller 110, in an embodiment the network link circuit 130 receives network link notices via input/output ports [190A . . . 190D] from various other network devices in communication with the network switch 100, and stores received network link notices.

Additionally, in an embodiment the network link circuit 130 generates network link notices relating to the network switch 100. The transmit circuit 170 transmits the generated network link notices to other network devices via the first input/output ports [190A . . . 190D].

In an embodiment, both transmitted and received network link notice can conform to any known or later developed network forming protocol for establishing network links and capable of establishing links between the network switch 100 and other switches/devices in the network so as to enable the other switches/devices to select a network link by which to send packets to the network switch 100. In one embodiment, such network link notices conform to a STP protocol and take the form of Bridge Protocol Data Units (BPDUs) used for Ethernet networks.

The received network link notices can include cost information relating to each port of each remote network device, such as the maximum data transfer rate of each port and whether each remote port is EEE compliant by passing EEE information or embedding such information within another parameter (such as cost). The cost information provides one form of a suitable metric for evaluating a relative worthwhileness of transmitting data over a link coupled to a particular port. Additionally, the network link circuit 130 can store similar cost information about the resident input/output ports [190A . . . 190D] of the example network switch 100, and so, in an embodiment, the generated network link notices discussed above to be transmitted to other devices can contain containing such BEE and other cost information.

As mentioned above, EEE-compliant ports can be given higher costs than non-EEE-compliant ports. These costs can allow protocols, such as STP, to remove loops and create loopless network links over a looped network, for example as spanning trees, while simultaneously minimizing power consumption of individual network devices and networks in general.

Next, the network cost calculating circuit 140 can calculate the total costs of using the input/output ports [190A . . . 190D] using the network link notices residing in the network link circuit 130. In a variety of varying embodiments, the network cost calculating circuit 140 can take not merely EEE compliance information into account, but other information as well including, but not limited to, LAN speed, port speed, switch speed, other characteristics of switches or ports having low-power settings, and so on.

Then, the switch enable/disable determining circuit 160 accesses the cost information of the network cost calculating circuit 140 to determine which resident input/output ports 190A . . . 190D to enable or disable so as to remove redundant pathways and loops while minimizing or otherwise providing lower power consumption. The example port enable/disable circuit 160 is described as using an STP algorithm, for the purposes of clarity. However, other suitable algorithms for configuring network links are contemplated in the present disclosure.

The port enable/disable circuit 160 then sends commands to the various input/output ports [190A . . . 190D] to enable or disable them. Assuming that one or more of the input/output ports [190A . . . 190D] are EEE compliant, such ports would operate according to low power mode when deselected. While the example network switch 100 has four input/output ports [190A . . . 190D], it is noted that the number of ports that may be controlled can be any integer number greater or equal to two.

In situations where two or more of the input/output ports [190A . . . 190D] provide a plurality of links with a second network device, and where a subset of the two or more first input/output ports [190A . . . 190D] are EEE capable, the respective network link notices for each input/output port [190A . . . 190D] will be different based at least in part on their individual BEE capability.

Figure 2:
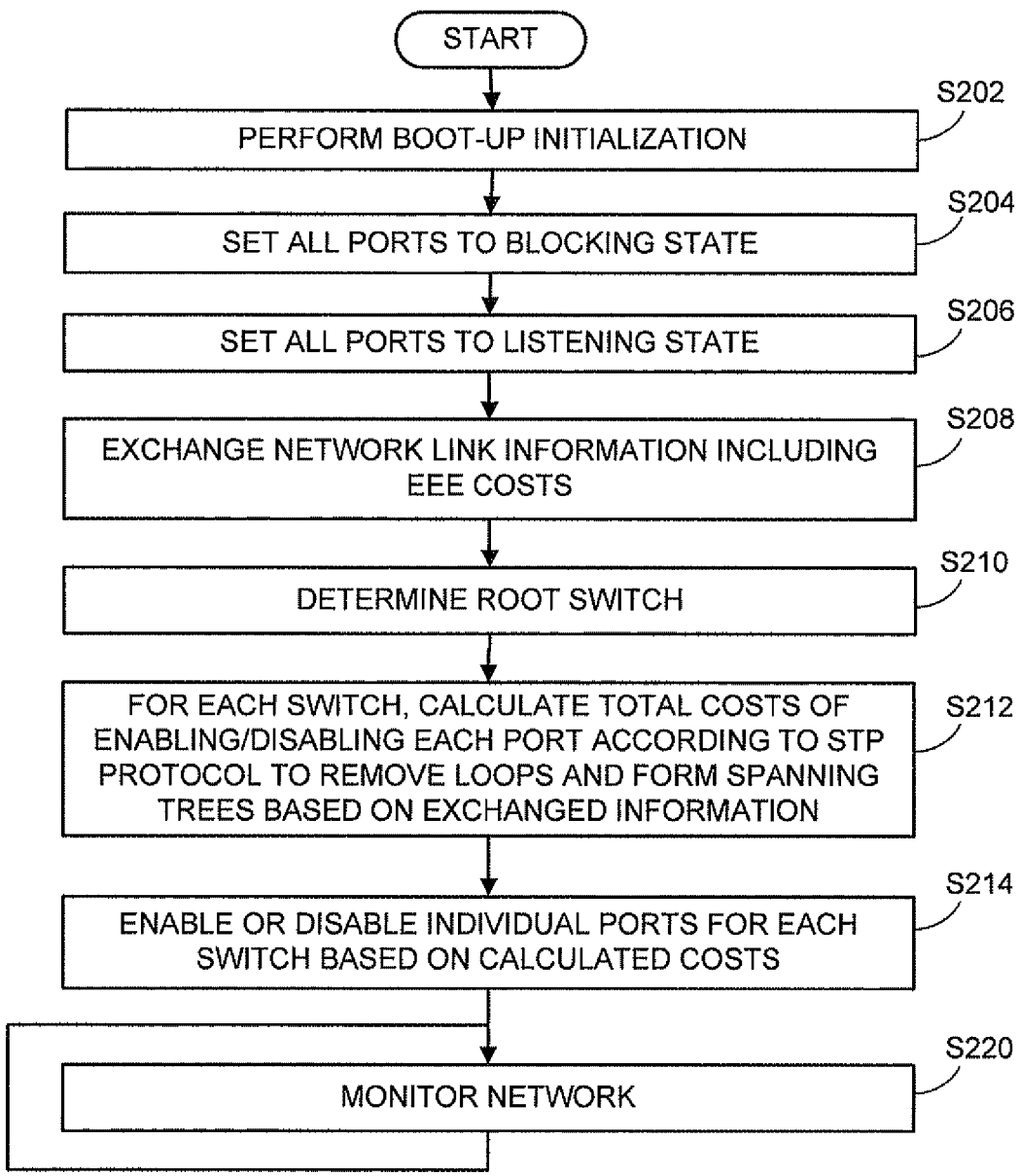
FIG. 2 is a flowchart outlining an example operation of the disclosed methods and systems for configuring a network according to energy-saving criteria.

FIG. 2 is a flowchart outlining an example operation of the disclosed methods and systems for configuring a network. While the below-described operations are described as occurring in a particular sequence for convenience, it is noted that the order of various steps may be changed from embodiment to embodiment. It is further noted that some of the various listed steps may occur simultaneously or may occur in an overlapping fashion. Likewise, it is noted that multiple listed steps may be listed to describe the effects of a single event or action, and similarly a single listed step may be used to describe multiple events or actions.

The process starts in step S202 where a network, such as an Ethernet-based network, is powered up and individual network devices, such as switches and bridges, are initialized according to a boot-up protocol. Next, in step S204, the ports for each network device are set to a blocking state according to an STP protocol or other suitable link communications protocol. Then, in step S206, the ports for each network device are set to a listening state according to the STP protocol used by the network or other suitable link communications protocol. Control continues to step S208.

In step S208, network link notices, which include performance information and EEE compliance information relating to each port of each network device, are exchanged (transmitted and received) among network devices. Next, in step S210, a root switch/device is selected. Then, in step S212, for each device in the network, in an embodiment total costs are calculated for each port based upon the utilized STP protocol and exchanged network link notices so as to create the appropriate spanning trees, for example. Generally, such costs are used to allow each network device to calculate a least cost link to the root switch/device. That is, each switch/device determines the cost of each possible path from itself to the root. From these, it picks one with the smallest cost (a least-cost path). The port connecting to that path becomes the root port (RP) of the switch/device. By this means, the switches/devices on a network segment collectively determine which device has the least-cost path from that network segment to the root. The port connecting this bridge to the network segment is then the designated port (DP) for the segment.

As discussed above, the network link notices used to determine costs can include: the speed of a switch; the type of protocol and/or speed of an individual port; whether an entire switch or individual switch port is EEE-compliant or not; whether a switch as a whole has an appreciable power savings when disabled that goes beyond EEE compliance; and any other suitable criteria that a user might introduce. Control continues to step S214.

In step 214, the various ports for each network device are enabled or disabled based upon the determination(s) of step S212. Next, in step S220, the network is monitored for failures that might necessitate network reconfiguration to restore connectivity among network segments.

Figure 3A:
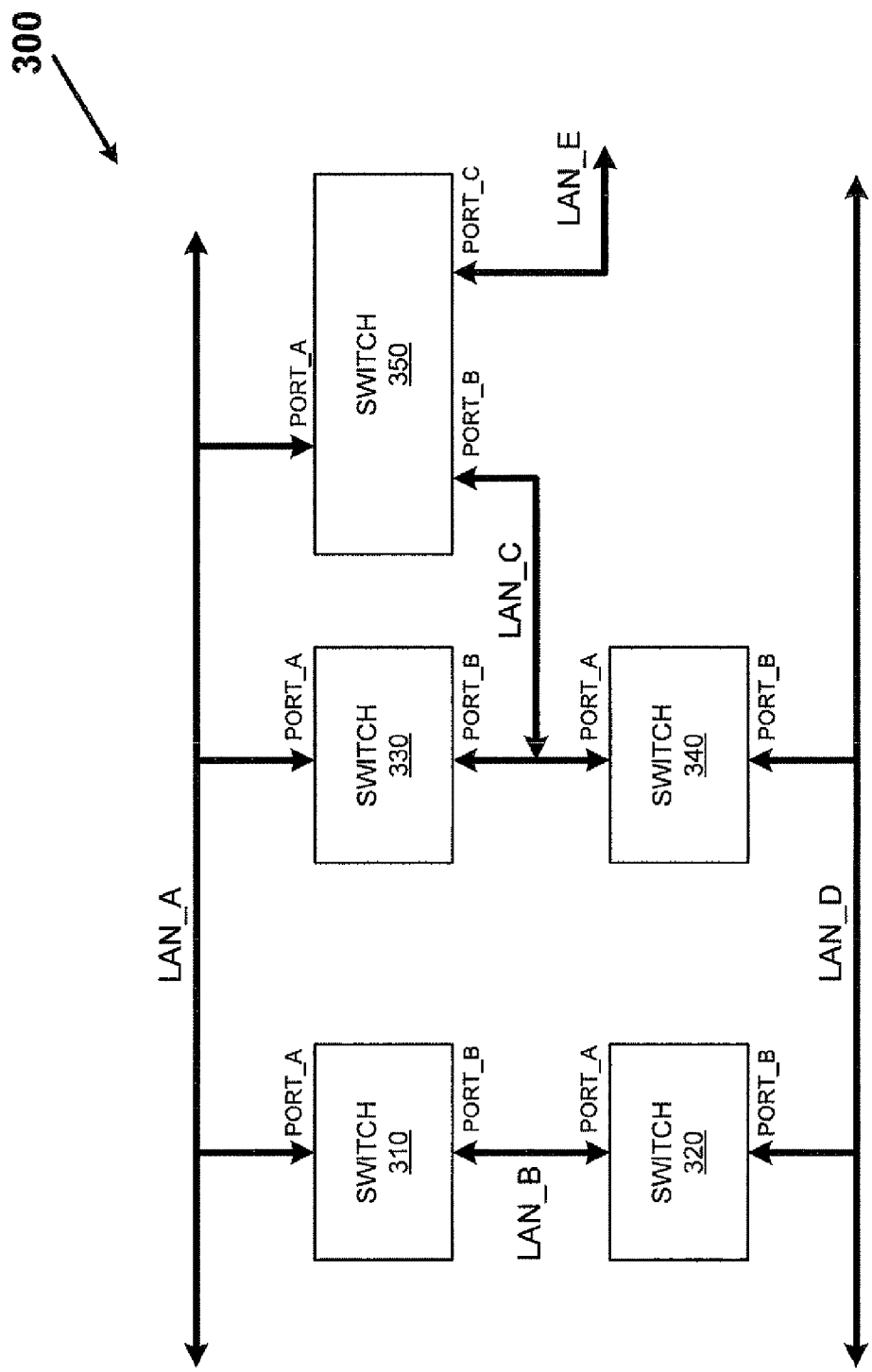
FIG. 3A is an example of a network having multiple network segments and switches capable of being configured according to energy saving criteria.

FIG. 3A is an example of a network 300 having multiple network segments [LAN_A . . . LAN_E] and switches 310 . . . 350 capable of being configured according to energy saving criteria. In the present example, it is assumed that the ports for switches 320 and 350 are all EEE compliant, while the ports of switches 310, 330 and 340 are all non-BEE compliant.

Figure 3B:
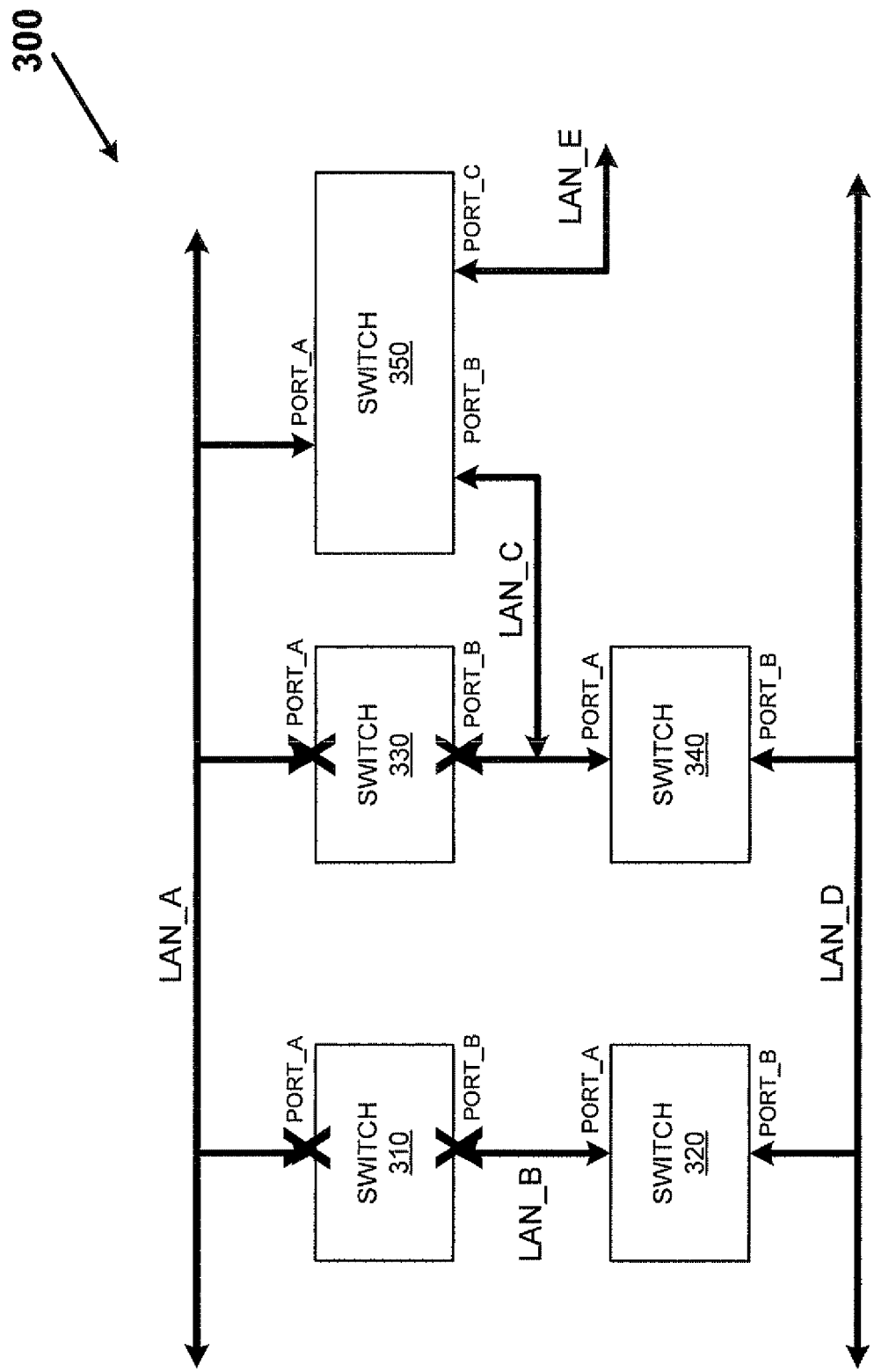
FIG. 3B depicts the network of FIG. 3A after being configured according to an STP protocol without taking into account the energy consumption of individual switch ports.

FIG. 3B depicts the network 300 of FIG. 3A after being configured according to an STP protocol without taking into account the energy consumption of individual switch ports. As can be seen in FIG. 3B, redundant pathways and loops are removed while connectivity between all LAN segments [LAN_A . . . LAN_E] is preserved.

Figure 3C:
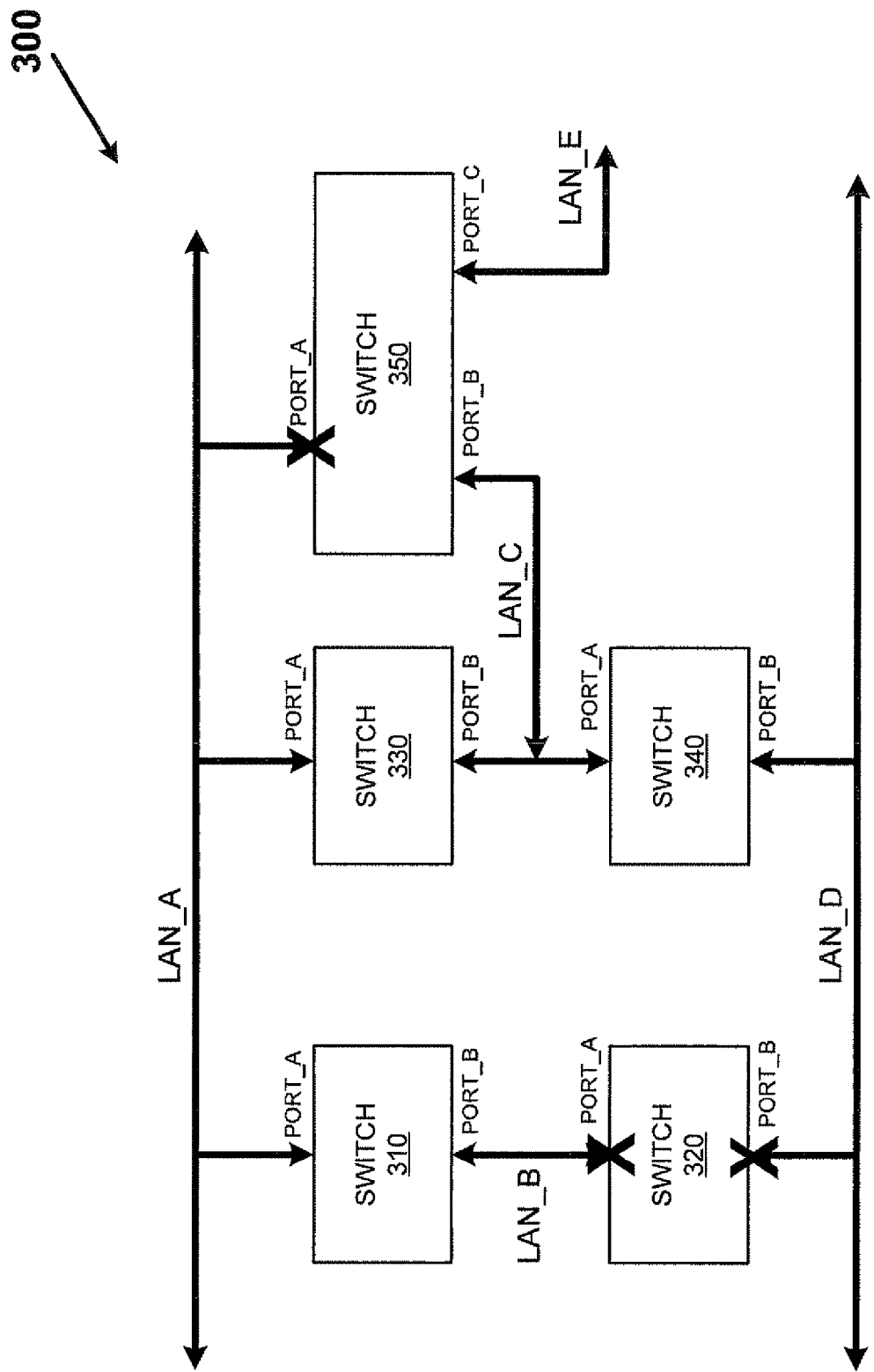
FIG. 3C depicts the network of FIG. 3A after being configured according to an STP protocol while taking into account the energy consumption of individual switch ports.

FIG. 3C depicts the network 300 of FIG. 3A after being configured according to an STP protocol while taking into account the BEE compliance of individual switch ports. As can be seen in FIG. 3C, redundant pathways and loops again are removed while connectivity between all LAN segments [LAN_A . . . LAN_E] is preserved. However, because PORT_A and PORT_B of switch 320, as well as PORT_A of switch 350, are disabled, the network 300 as a whole consumes less power by virtue of the EEE compliance of the disabled BEE compliant ports. The example of FIGS. 3A-3C demonstrates that EEE compliant ports are more likely than non-EEE compliant ports to be disabled using the methods and systems described above.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A network device in a network, comprising:
a plurality of ports each connected to the network;
a network link circuit configured to generate network link notices based in part on a power consumption capability of one or more ports of the plurality of the ports for establishing network links between the network device and other network devices in the network, the other network devices including switches, the power consumption capability indicating at least whether portions of the one or more ports are configured to be selectively shutdown;
transmit circuitry configured to transmit the network link notices to the other network devices through the one or more of the ports; and
port enable/disable circuitry configured to select, based on the network link notices, network links that favor ports without portions configured to be selectively shutdown, over other ports with the portions, for transmitting network traffic through the selected network links.

2. The network device of claim 1, wherein the network link notices include cost information relating to whether one or more selected ports are Energy Efficient Ethernet (EEE) compliant.

3. The network device of claim 2, wherein the network link notices also include cost information relating to data transfer speeds of the one or more selected ports.

4. The network device of claim 3, wherein the network link circuit generates the network link notices conforming to a Spanning Tree Protocol (STP).

5. The network device of claim 1, wherein the network link notices are transmitted using a layer 2 protocol for selecting network links.

6. The network device of claim 1, wherein at least one of the ports is configured to operate according to low power mode when deselected according to an EEE protocol.

7. The network device of claim 1, wherein two or more of the ports provide a plurality of links with another network device, wherein a subset of the two or more ports are EEE capable, and wherein network link information for each of the two or more ports is different based at least in part on the two or more ports' individual EEE capability.

8. The network device of claim 1, further comprising:
a network cost calculation circuit that calculates a total cost of enabling each of the ports according to a network-forming protocol, EEE compliance of the one or more ports and cost information from network link notices received from the other network devices; wherein
the port enable/disable circuitry enables or disables each of the ports based on the respective costs calculated by the network cost calculation circuit.

9. A method for configuring a network, comprising:
generating network link notices based in part on a power consumption capability of one or more ports in the network for establishing network links between a network device and other network devices, the other network devices including switches in the network, the power consumption capability indicating at least whether portions of the one or more ports are configured to be selectively shut down;
transmitting the network link notices to the other network devices through the one or more ports; and
selecting, based on the network link notices, network links that favor ports without portions configured to be selectively shutdown, over other ports with the portions, for transmitting network traffic through the selected network links.

10. The method of claim 9, wherein generating the network link notices further comprises:
generating the network link notices to include cost information relating to whether one or more selected ports are Energy Efficient Ethernet (EEE) compliant.

11. The method of claim 9, wherein generating the network link notices further comprises:
generating the network link notices to include cost information relating to data transfer speeds of the one or more selected ports.

12. The method of claim 11, wherein generating the network link notices further comprises:
generating the network link notices conforming to a Spanning Tree Protocol (STP).

13. The method of claim 9, wherein transmitting the network link notices comprises using a layer 2 protocol for selecting network links.

14. The method of claim 9, further comprising:
configuring at least one of the ports to operate according to low power mode when deselected according to an EEE protocol.

15. The method of claim 9, wherein generating the network link notices further comprises:
generating the network link notices to provide network link information of two or more of the ports that provide links with another network device based in part on individual EEE capability of the ports.

16. The method of claim 9, further comprising:
calculating a total cost of enabling each of the ports according to a network-forming protocol, EEE compliance of the one or more ports and cost information from network link notices received from the other network devices; and
enabling or disabling each of the ports based on the respective costs calculated by a network cost calculation circuit.

17. A network device in a network, comprising:
a plurality of ports each connected to the network;
a network link circuit configured to receive network link notices for establishing network links between the network device and other network devices in the network, the other network devices including switches, the received link notices including information about a power consumption capability of remote ports in the other network devices, the power consumption capability indicating at least whether portions of the remote ports are configured to be selectively shut down;
a network cost calculating circuit configured to calculate total costs associated with using the plurality of ports for sending packets to the other network devices, the calculated total costs being based at least in part on the power consumption capability of the remote ports; and
a port enable/disable circuit configured to select, based on the network link notices, network links that favor ports without portions configured to be selectively shutdown, over other ports with the portions, for transmitting network traffic through the selected network links.

18. The network device of claim 17, wherein the network cost calculating circuit is further configured to calculate total costs based on whether one or more of the remote ports are Energy Efficient Ethernet (EEE) compliant.

19. The network device of claim 18, wherein the network cost calculating circuit is further configured to calculate total costs based on whether the plurality of ports are Energy Efficient Ethernet (EEE) compliant.

20. The network device of claim 19, wherein the network link notices also include cost information relating to data transfer speeds of the remote ports, and wherein the network link notices conform to a Spanning Tree Protocol (STP).

* * * * *